J. A. WHEELER.
HEADER.
APPLICATION FILED NOV. 13, 1918.
1,297,950.
Patented Mar. 18, 1919.
3 SHEETS—SHEET 1.
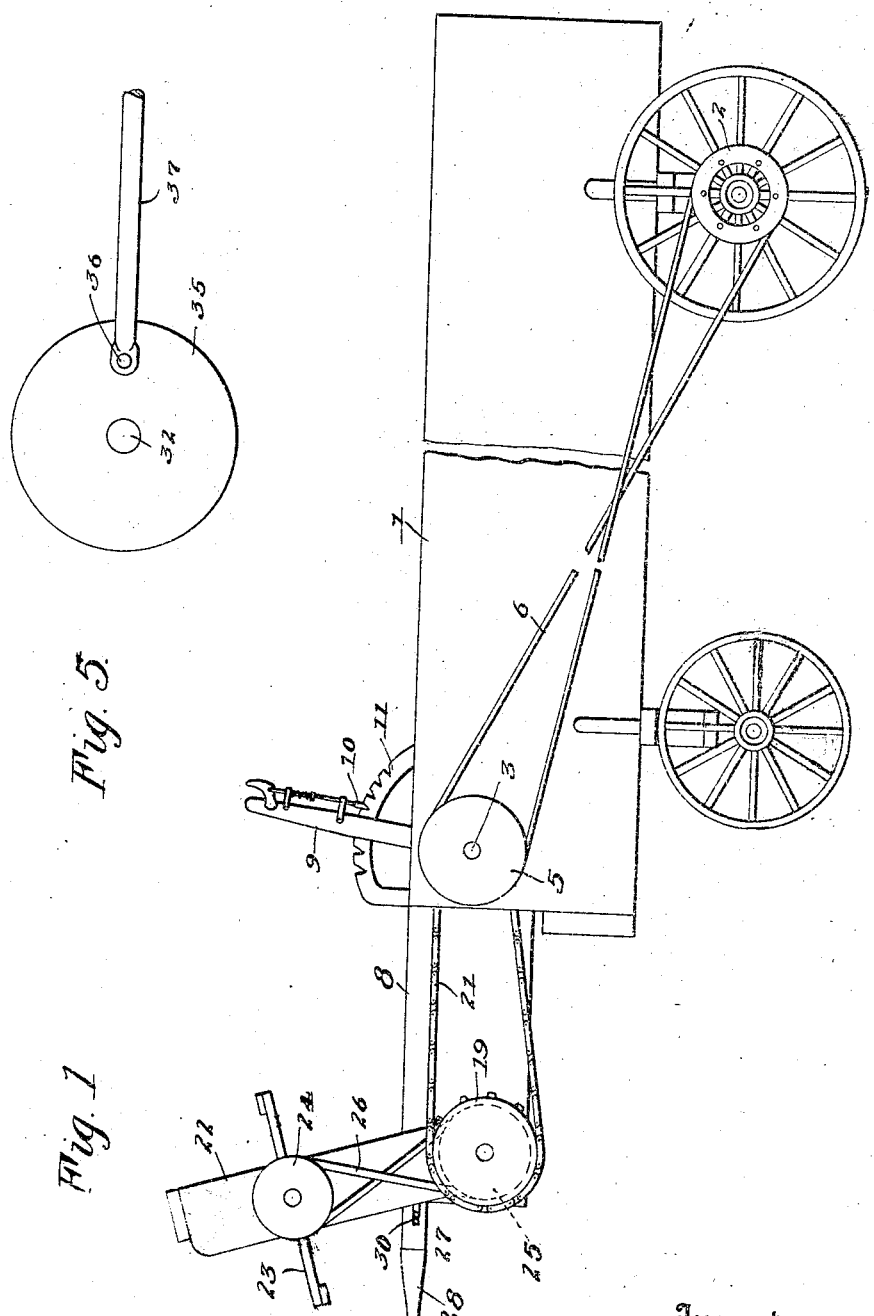
Witnesses
R. A. Thomas
Inventor
J. A. Wheeler
By Victor J. Evans
Attorney

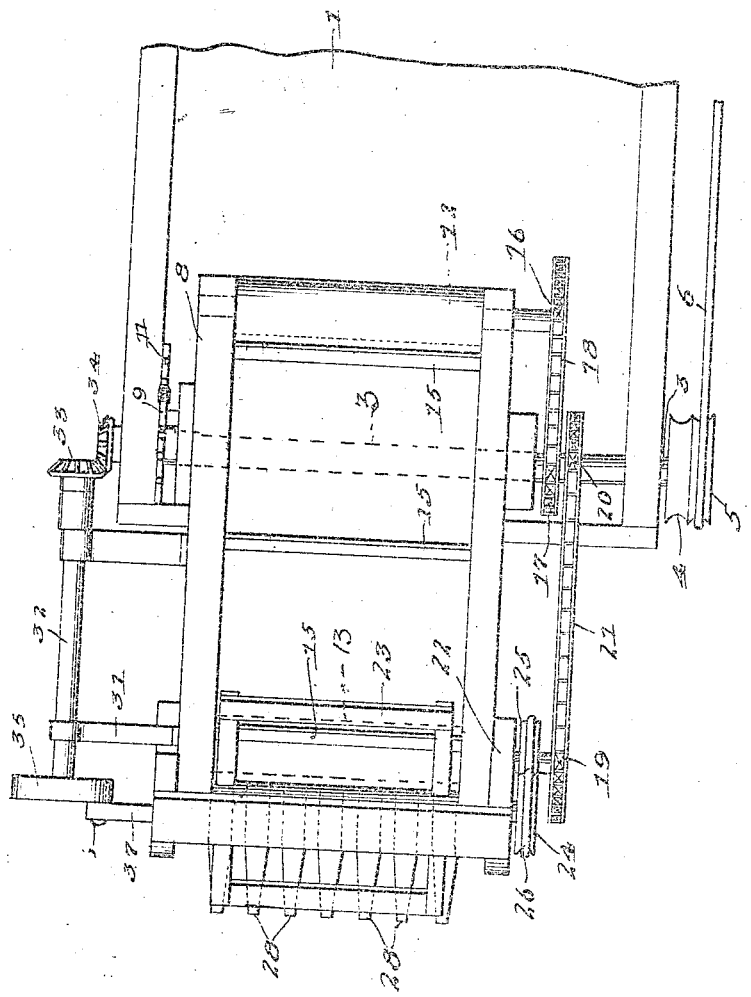

J. A. WHEELER.
HEADER.
APPLICATION FILED NOV. 13, 1918.
1,297,950.
Patented Mar. 18, 1919
3 SHEETS—SHEET 3.
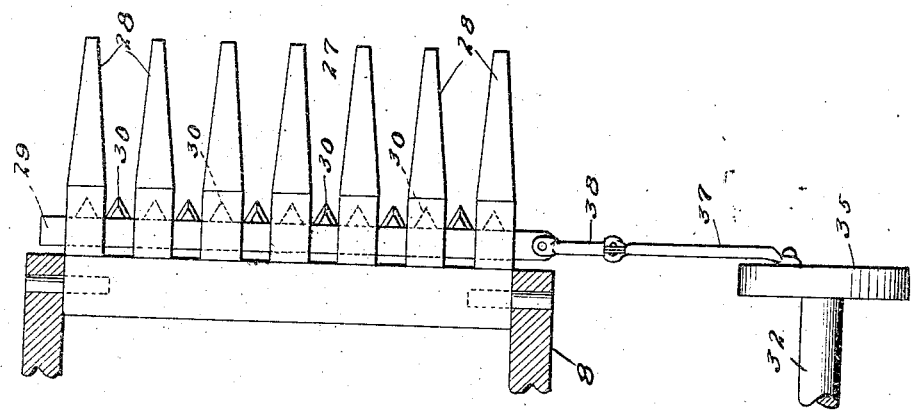
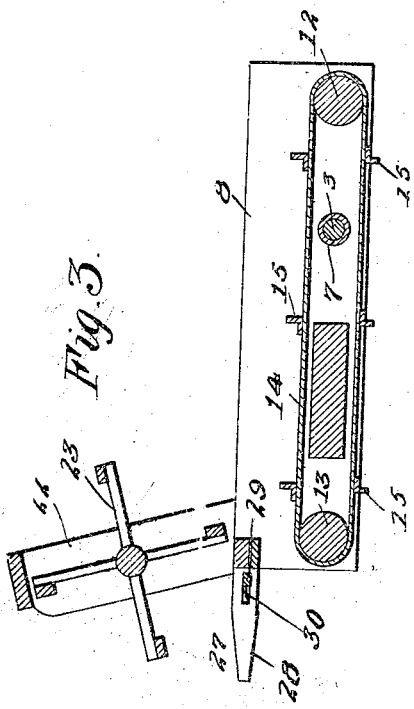
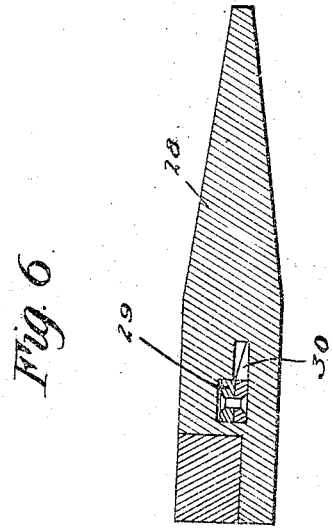
Witnesses
P. A. Thomas
Inventor
J. A. Wheeler
By Victor J. Evans
Attorney

UNITED STATES PATENT OFFICE.

JAMES A. WHEELER, OF MANGUM, OKLAHOMA.

HEADER.

1,297,950. Specification of Letters Patent. Patented Mar. 18, 1919.

Application filed November 13, 1918. Serial No. 262,311.

*To all whom it may concern:*

Be it known that I, JAMES A. WHEELER, a citizen of the United States, residing at Mangum, in the county of Greer and State of Oklahoma, have invented new and useful Improvements in Headers, of which the following is a specification.

The invention relates to headers and it consists in the novel features hereinafter described and claimed.

An object of the invention is to provide a header of simple and durable structure especially adapted to be used for removing the heads from standing stalks of Kafir corn, maize, sorghum and the like and with this object in view the header is in the form of an attachment adapted to be applied to the body of a wagon or float there being means for operating the header from one of the wheels at the wagon or float.

The header comprises a frame which is pivotally mounted upon a shaft for vertical swinging movement with relation to the body of the wagon or float there being a lever mechanism provided for holding the frame at an adjusted position with relation to the body. A belt is mounted for movement along the frame and a cutting apparatus is pivotally mounted at the forward end of the frame, means are provided for operating the cutting apparatus from the shaft upon which the frame is pivotally mounted. A super-structure is mounted upon the forward portion of the frame and a reel is carried by the super-structure, means are provided for rotating the reel whereby its blades may come in contact with the heads of the plant and sweep them rearwardly and upon the upper run of the belt as the heads are severed by the cutting apparatus from the stalks of the plant.

In the accompanying drawings:—

Figure 1 is a side elevation of the header, Fig. 2 is a top plan view of the same, Fig. 3 is a longitudinal section of the header means. Fig. 4 is a plan view of the cutting means. Fig. 5 is a detail view of the crank for operating the cutting means. Fig. 6 is a sectional view through one of the header fingers.

The body of the wagon or float is indicated at 1 in the drawing and a pulley 2 is adapted to be secured to one of the rear wheels of the wagon or float in a usual manner. A shaft 3 is journaled in the sides of the body and a pulley 4 is loosely mounted on the said shaft. A pulley 5 is fixed to the shaft 3. A belt 6 is trained around the pulley 2 and may be passed from the pulley 4 to the pulley 5 or vice versa in a usual manner. When the belt 6 is trained around the pulley 5 the shaft 3 rotates with the pulley 2. A sleeve 7 surrounds the intermediate portion of the shaft 3 and a frame 8 is mounted upon the said sleeve. The sleeve passes transversely through the frame 8 at a point between the ends thereof. A lever 9 is fixed to the frame 8 and carries a spring pressed pawl 10 which is adapted to engage between the teeth of a dentate segment 11 mounted on the side of the body 1 whereby the lever 9 may be held at an adjusted position. By removing the pawl 10 from between the teeth of the segment 11 the lever 9 may be swung whereby the sleeve 7 may be turned upon the shaft 3 and the forward end of the frame 8 may be raised or lowered. A roller 12 is journaled at the rear end of the frame 8 and a roller 13 is journaled at the forward end thereof. A belt 14 is trained around the rollers 12 and 13 and is provided at its outer side with spaced slats 15, a pulley 16 is fixed to the shaft of the roller 12 and a pulley 17 is fixed to the shaft 3, a belt 18 is trained around the pulleys 16 and 17 and is adapted to transmit rotary movement from the shaft 3 to the roller 12. When the roller 12 rotates the upper run of the belt 14 moves in a rearward direction. A pulley 19 is fixed to the shaft of the roller 13 and a pulley 20 is fixed to the shaft 3. A belt 21 is trained around the pulleys 19 and 20 and is adapted to transmit rotary movement from the shaft 3 to the shaft of the roller 13, therefore the belt 21 assists in moving the upper run of the belt 14 in a rearward direction.

A super-structure 22 is mounted upon the forward portion of the frame 8. A reel 23 is journaled in the super-structure 22 at a point above the forward end of the frame 8 and the shaft of the reel 23 carries a fixed pulley 24. A pulley 25 is fixed to the shaft of the roller 13 and a cross belt 26 is trained around the pulleys 24 and 25. Consequently it will be seen that means are provided for locating the reel 23 from the shaft of the roller 13.

A cutting apparatus 27 is pivotally mounted at the forward end of the frame 8 for vertical swinging movement and the apparatus is located below the reel 23. The cutting apparatus 27 includes a number of spaced forwardly disposed fingers 28. The cutting apparatus also includes a bar 29 mounted for longitudinal movement and carrying a series of blades 30, the blades 30 are adapted to move transversely across the rear ends of the fingers 28 in a usual manner and sever the heads of the plants from the stalks thereof as the plants come in contact with the said blade.

A bracket 31 is attached to one side of the frame 8 in the vicinity of the forward end thereof and a shaft is journaled in the said bracket. A similar bracket is mounted upon the frame in the vicinity of the rear ends thereof, and receives the rear portions of the shaft 32. A beveled pinion 33 is pitched to the rear end of the shaft 32 and meshes with a similar pinion 34 fixed to the shaft 2. The shaft 32 carries at its forward edge a disk 35 which in turn carries an eccentrically positioned pin 36. A pitman 37 is pivoted at one end upon the pin 36 and a link 38 is connected at one end by means of a universal joint with the free end of the pitman 37 and the other end of the said link 38 is pivotally connected with the bar 29 of the cutting apparatus. Consequently it will be seen that means are provided for rotating the shafts 32 from the shafts 2 and the pitman 37 and links 38 will reciprocate the bar 29 as the disk rotates with the shaft 32.

The apparatus is designed to cut the heads from two rows of plants simultaneously and horses or draft animals may be employed for moving the apparatus along the rows of plants. As the fingers 28 come in contact with the stalks of the plants the said fingers may swing in an upward direction thereby upwardly inclining the blade 30. When the stalks come in contact with the said blades the lower portions of the plants are inclined forwardly and the blades of the reels strike the heads of the plants and move them rearwardly consequently the blades will completely sever the heads from the stalks and the heads are swept or cast rearwardly by the blades of the reel and deposit upon the upper run of the belt 14. As the upper run of the said belt is moving rearwardly the heads are carried back and deposited upon the upper surface of the floor of the body of the wagon or float to which the attachment is applied.

From the foregoing description taken in conjunction with the accompanying drawings it will be seen that a header of simple and durable structure is provided and that the same may be used to advantage for removing the heads from standing plants and for gathering or collecting the same.

Having described the invention what is claimed is:—

A header comprising a support, a shaft journaled thereon, means for rotating the shaft, a sleeve mounted on the shaft, a frame mounted on the sleeve, rollers journaled at the ends of the frame, means for rotating the rollers from the shaft, a belt trained around the rollers, means for swinging the frame and for securing the same at an adjusted position, a cutting apparatus located at the forward edge of the frame, means for operating the cutting apparatus from the shaft, and a reel located at the forward end of the frame and means for rotating the reel from one of the rollers.

In testimony whereof I affix my signature.

JAMES A. WHEELER.